(12) United States Patent
Alsobrook et al.

(10) Patent No.: US 8,034,749 B2
(45) Date of Patent: Oct. 11, 2011

(54) AEROGELS EFFECTIVE TO REDUCE DRILLING FLUID DENSITY

(75) Inventors: Charles W. Alsobrook, Houston, TX (US); Thomas A. Jones, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 847 days.

(21) Appl. No.: 10/744,443

(22) Filed: Dec. 23, 2003

(65) Prior Publication Data

US 2004/0147405 A1    Jul. 29, 2004

Related U.S. Application Data

(60) Provisional application No. 60/437,305, filed on Dec. 31, 2002.

(51) Int. Cl.
     *C09K 8/00*    (2006.01)
     *C09K 8/05*    (2006.01)
(52) U.S. Cl. ........ 507/140; 166/305.1; 177/65; 507/143
(58) Field of Classification Search ................ 507/140, 507/143; 166/305.1; 175/65
See application file for complete search history.

(56) References Cited

U.S. PATENT DOCUMENTS

| | | | |
|---|---|---|---|
| 2,093,454 A | 9/1937 | Kistler | |
| 2,109,337 A | 2/1938 | Mayfield | |
| 2,455,188 A | 12/1948 | Oxford | |
| 2,584,085 A * | 1/1952 | Stross | 508/136 |
| 3,122,520 A | 2/1964 | Lentz | |
| 3,951,824 A | 4/1976 | Maxson | |
| 5,501,277 A | 3/1996 | Onan et al. | |
| 5,605,872 A | 2/1997 | Engel et al. | |
| 5,728,654 A | 3/1998 | Dobson, Jr. et al. | |
| 5,837,655 A | 11/1998 | Halliday et al. | |
| 5,851,958 A | 12/1998 | Halliday et al. | |
| 6,131,661 A | 10/2000 | Conner et al. | |
| 6,475,561 B1 | 11/2002 | Schwertfeger | |
| 6,479,416 B1 | 11/2002 | Frank et al. | |
| 6,481,649 B1 | 11/2002 | Schmidt | |
| 2004/0147405 A1 | 7/2004 | Alsobrook et al. | |
| 2006/0009364 A1 * | 1/2006 | Dobson et al. | 507/110 |

FOREIGN PATENT DOCUMENTS

| | | |
|---|---|---|
| EP | 0 786 507 A | 7/1997 |
| GB | 1 171 409 A | 11/1969 |
| WO | WO 92/20623 | 11/1992 |
| WO | WO 94/25149 | 11/1994 |

OTHER PUBLICATIONS

Lee et al., Low-density hydrophobic aerogels, Journal of Non-Crystalline Solids, 1995, 186, 18-22.*
Restek Corporation, Mesh Size Conversions Reference Chart, http://www.restek.com/calcs/ref_meshes.asp, 2005.*
Trademark Serial No. 75414818, NANOGEL, May 6, 2003.*
Cameron et al, The Effect of Drilling Fluid Density and Underbalanced Drilling on Formation Damage Minimization, F95-P-84, Sep. 11, 1995, Exploration & Production Technology Group, Amoco Corporation.
Sanchez, Liteden Density Reductor For Drilling Fluids, downloaded from Internet (http://www.mauretechnology.com/JIP/DGD/Presentations/KOmeeting/PDVSA.pdf), Sep. 2001, La filial de petréleos de Venezuela (PDVSA).
Pekala, R. W., "Organic Aerogels from the Polycondensation of Resorcinol with Formaldehyde," Journal of Materials Science, 1989, pp. 3221-3227, vol. 24, No. 9.
Kistler, S.S., "Coherent Expanded Aerogels and Jellies," Nature A Weekly Journal of Science, 1931, p. 741, vol. 127, No. 3211, Macmillan and Co., Limited, New York, USA.
Gesser, H.D. and Goswami, P.C., "Aerogels and Related Porous Materials," Chemical Reviews, 1989, pp. 765-788, vol. 89, No. 4, American Chemical Society.
Gregg, S.J. and Sing, K.S.W., "6. The Use of Gas Adsorption for the Determination of Surface Area and Pore Size Distribution," Adsorption, Surface Area and Porosity, Second Edition, 1982, pp. 283-286, Academic Press.
Rutenberg, M. W. and Solarek, D.; "Chapter X Starch Derivatives: Production and Uses"; Starch: Chemistry and Technology; 1984; pp. 311-388; Academic Press, Inc.; USA.
USPTO, First Office Action for U.S. Appl. No. 11/456,389, Feb. 16, 2007.
The Morris Law Firm, P.C., Response to First Office Action for U.S. Appl. No. 11/456,389, Apr. 24, 2007.
PCT International Search Report for Application No. PCT/US03/41734, Dec. 13, 2003.
The Morris Law Firm, P.C., Article 19 Amendment for Application No. PCT/US03/41734, Aug. 2, 2004.
The Morris Law Firm, P.C., Response to References for Application No. PCT/US03/41734, Jan. 26, 2005.
PCT International Preliminary Examination Report for Application No. PCT/US03/41734, Apr. 8, 2005.
Journal of Non-Cyrstalline Solids, North Holland Physics Publishing Amsterdam, NL, vol. 186, Jun. 15,1995, pp. 18-22.

* cited by examiner

*Primary Examiner* — Timothy J. Kugel
(74) *Attorney, Agent, or Firm* — Paula D. Morris; The Morris Law Firm, P.C.

(57) ABSTRACT

Use of aerogels reduce the density of system fluids useful during drilling operations and system fluids comprising aerogels.

41 Claims, No Drawings

AEROGELS EFFECTIVE TO REDUCE DRILLING FLUID DENSITY

PRIORITY

This application claims the benefit of the filing date of U.S. Provisional Application Ser. No. 60/437,305 filed Dec. 31, 2002.

FIELD OF THE APPLICATION

The present application relates to the use of aerogels to reduce the density of system fluids useful during drilling operations.

BACKGROUND OF THE APPLICATION

Low density fluid systems reduce the volume of fluid invasion into a producing reservoir, thus minimizing damage to the pay zone. More importantly, fluid systems with very low densities can be used to drill reservoirs in underbalanced pressure conditions that virtually eliminate invasion and damage to the reservoir. Low density system fluids having effective rheology which may be produced at relatively low cost are always needed.

SUMMARY OF THE APPLICATION

The present application provides a method for reducing density of a system fluid useful during drilling operations. The method comprises providing a quantity of a system fluid comprising an amount of one or more aerogels, the system fluid having effective rheology and lubricity properties and having a reduced density compared to the same system fluid absent the one or more aerogels.

The present application also provides a system fluid having effective rheology comprising an amount of one or more aerogels effective to reduce density of said system fluid compared to the same system fluid absent the one or more aerogels.

The system fluid is selected from the group consisting of drilling fluids, drill-in fluids, completion fluids, workover fluids, spotting fluids, and cementing fluids; preferably drilling fluids, drill-in fluids, completion fluids, workover fluids, and spotting fluids.

In one aspect, the system fluid comprises an inorganic aerogel. In another aspect, the system fluid comprises an organic aerogel.

In one aspect, the aerogel is hydrophilic. In another aspect the aerogel is hydrophobic.

In one aspect, the aerogel comprises an element selected from the group consisting of silicon, aluminum, titanium, zirconium, tin, lithium, cerium, vanadium, and mixtures thereof. In a preferred aspect, the aerogel comprises silicon, preferably silicon oxide.

In one aspect, the aerogel comprises particle sizes of up to about 200 μm. In another aspect, the aerogel comprises particle sizes of about 1 μm or more. In yet another aspect, the aerogel comprises particle sizes of from about 1 μm to about 44 μm. In another aspect, the aerogel comprises a particle size distribution effective for bridging producing formations. In yet another aspect, the aerogel comprises a particle size distribution effective for filter cake development.

In one aspect, the aerogel particles comprise a density of about 0.2 g/cm$^3$ or less, preferably about 0.35 g/cm$^3$ or less, more preferably from about 0.1 to about 0.35 g/cm$^3$. In one aspect, the aerogel comprises about 90% gas or more. In another aspect, the aerogel comprises about 95% gas or more.

In another aspect, the aerogel comprises a total surface area of about 200 m$^2$/g or more. In yet another aspect, the aerogel comprises a total surface area of about 600 m$^2$/g or more; preferably about 700 m$^2$/g or more.

In one aspect, the aerogel comprises a bubble matrix comprising retained gas selected from the group consisting of air, oxygen, helium, nitrogen, carbon dioxide, and inert or low activity gases. In another aspect, the aerogel comprises a bubble matrix comprising retained air. In yet another aspect, the aerogel comprises a bubble matrix comprising retained helium.

In one aspect, the aerogels are stable at temperatures of about 150° C. or more; at temperatures of about 250° C. or more; at temperatures of about 350° C. or more; at temperatures of about 450° C. or more; and, in a preferred aspect, at temperatures of about 600° C. or more. A preferred aerogel is NANOGEL®.

In one aspect, the amount of said aerogel is sufficient to produce a system fluid having a density of from about 1 lb/gal to about 8 lb/gal., preferably having a density of from about 3 lb/gal to about 6 lb/gal.

In one aspect, the system fluid is hydrophilic and said aerogel is hydrophilic. In another aspect, the system fluid is hydrophobic and said aerogel is hydrophobic.

In one aspect, the system fluid produces a filter cake comprising said aerogel that is converted to a gel upon exposure to one or more component selected from the group consisting of heat, a pH of from about 8 to about 13, and contact with water. In yet another aspect, a borehole comprising the filter cake comprising said aerogel is cleaned without using acid.

In one aspect, the system fluid is selected from the group consisting of water-based or oil-based fluid. In another aspect, system fluid comprises an oil selected from the group consisting of olefins, paraffins, water insoluble polyglycols, water insoluble esters, diesel, water insoluble Fischer-Tropsch reaction products, other organic materials that are non-toxic at the concentrations used, and combinations thereof.

In one aspect, the system fluid comprises one or more non-toxic synthetic olefins. In another aspect, the one or more olefins are selected from the group consisting of polyalphaolefins, linear alpha olefins, and internal olefins. In a most preferred aspect, the system fluid is selected from the group consisting of PERFFLOW® and SCIFLOW™.

In another aspect, the amount of aerogel is sufficient to produce a system fluid having a density of from about 1 lb/gal to about 8 lb/gal, preferably from about 3 lb/gal to about 6 lb/gal. In another aspect, the amount of aerogel is from about 55 to about 62% of said system fluid.

DETAILED DESCRIPTION OF THE APPLICATION

The present application relates to system fluids "useful during drilling operations," including but not necessarily limited to "drilling" fluids, "drill-in" fluids, "completion" fluids, "workover" fluids, "spotting" fluids, and "cementing" fluids. Preferred system fluids are drilling system fluids selected from the group consisting of "drilling" fluids, "drill-in" fluids, "completion" fluids, "workover" fluids, and "spotting" fluids.

A "drill-in" fluid is pumped through the drill pipe while drilling through the "payzone," or the zone believed to hold recoverable oil or gas. A "drilling fluid" is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole. A "completion fluid" is used to protect the "payzone" during the completion phase of the well. Specially formulated fluids are used in connection with completion and workover operations to minimize damage to the formation. Workover fluids are used during remedial work in the well, such as removing tubing, replacing a pump, logging, reperforating, and cleaning out sand or other deposits. Spotting fluids are pumped downhole intermittently for various purposes. Cementing fluids are used cement the well liner in place.

Formation damage can result when solids and/or filtrate derived from one of these system fluids invades the formation during drilling operations. Such formation damage may be minimized by treating the well in a near-balanced condition (wellbore pressure close to formation pressure). In low-pressure reservoirs, the well often must be treated in an over-balanced and/or an under-balanced condition. If the well is over-balanced, the treating fluid is designed to temporarily seal perforations to prevent entry of fluids and solids into the formation. If the well is under-balanced, the treating fluid is designed to have a mud weight that generates lower hydrostatic pressure than the reservoir pressure, to prevent entry of drilling fluid to the formation.

Low density fluid systems minimize damage to the pay zone by reducing the volume of fluid invasion into a producing reservoir. More importantly, fluid systems with very low densities can be used to drill reservoirs in underbalanced pressure conditions that virtually eliminate invasion and damage to the reservoir. The present application provides novel reduced density system fluids comprising aerogels.

The density of a system fluid relates to the amount and average specific gravity of the solids in the system. The desired density of a given system fluid generally is dictated by the pressure in the formation. The present application involves the use of aerogel to reduce the density of system fluids for use during drilling operations while providing effective rheology and lubrication. Aerogels reduce the density of the system because the aerogels have a lower density than the system fluid. The aerogel may be an integral part of the system fluid, or the density of the system fluid may be reduced during drilling operations, for example by adding fluid comprising more of the aerogel or even adding mud-compatible aerogel to the mud pit during drilling operations.

An aerogel generally is defined as a gel with a gas, preferably air, as a dispersing agent. Aerogels generally are produced by drying a suitable gel. The term "gel" refers to a coherent, rigid, continuous three-dimensional network of colloidal particles. Gels are produced by the aggregation of colloidal particles (typically under acidic conditions when neutralizing salts are absent) to form a three dimensional gel microstructure. When a gel is dried (liquid removed from the pores) by means in which the coherent gel microstructure is preserved, such as by supercritical drying, a low density "aerogel" is formed.

Aerogels basically are selected from the group consisting of inorganic and organic aerogels. Organic aerogels are derived from widely diverse starting materials, e.g. melamine formaldehyde. W. Pekala, J. Mater, Sci. 1989, 24, 3221, incorporated herein by reference. Preferred aerogels are inorganic aerogels.

Exemplary inorganic aerogels are described in S. S. Kistler, Nature 1931, 127,741, incorporated herein by reference. These first aerogels were produced from water glass and an acid as the starting materials. In that case, the water was exchanged for an organic solvent in the wet gels obtained and this lyogel was then super-critically dried. In this way, hydrophilic aerogels were obtained, as disclosed for example in U.S. Pat. No. 2,093,454, incorporated herein by reference.

The colloidal component of inorganic aerogels generally comprises an element selected from the group consisting of silicon, aluminum, titanium, zirconium, tin, lithium, cerium, vanadium, and mixtures thereof. Methods for producing inorganic aerogels are described in H. D. Gesser, P. C. Goswarni, Chem Rev. 1989, 89, 765 et seq., incorporated herein by reference.

Preferred aerogels comprise silicon, most preferably silicon oxide. Silica aerogels have highly desirable properties such as, for example, optical transparency, extremely low density, and very low thermal conductivity. The size of the aerogel particles is not critical, and can range from about less than 1 μm to about 200 μm, preferably from about 1 μm to about 44 μm. Preferably, the aerogels have a particle size distribution effective to promote bridging and filter cake development, where needed. If the system is underbalanced, a filter cake is not required. However, where a system is near balanced or overbalanced, the filter cake will be required, and the particle size of the aerogel preferably is from about 1 to about 200 μm.

The silica aerogel particles can have any density less than the density of the particular system fluid. For most system fluids, suitable densities for the aerogel are about 0.2 g/cm$^3$ or less, 0.35 g/cm$^3$ or less, more preferably from about 0.1 to about 0.35 g/cm$^3$. The aerogels comprise at least about 90% gas, preferably from about 95.0% to about 99.0% gas, retained in the bubble matrix. The bubble matrix results in a substantial total surface area, typically about 200 m$^2$/g or more. Preferably, the internal surface area is about 600 m$^2$/g or more, more preferably about 700 m$^2$/g. or more. The surface area is calculated based on the amount of nitrogen adsorbed at five different relative pressures over the range 0.05 to 0.25 according to the Brunauer-Emmett-Teller (BET) model, which is referenced in Gregg, S. J. and Sing, K. S. W, "Adsorption, Surface Area and Porosity," p. 285, Academic Press, New York (1991), incorporated herein by reference.

The gas contained in the bubble matrix of the aerogel generally is air; however, the gas may be substantially any environmentally compatible gas, including but not necessarily limited to air, oxygen, helium, nitrogen, carbon dioxide, inert, or other low activity gases. The type of gas found in the bubbles generally is dictated by the types of aerogels that are commercially available. Ultra-light aerogels may be produced using helium as the gas. The aerogels do compress, but in contrast to hollow spheres, aerogels tend to resist crushing and/or breakage. Without limiting the invention to a particular mechanism of action, it is believed that fluid in the system moves into the bubble matrix under compression, giving the aerogel strength to resist breakage. Upon decompression, the fluid moves back out into the system fluid.

The aerogels are stable at temperatures of 150° C. or more, preferably about 250° C. or more, more preferably about 350° C. or more, even more preferably about 450° C., and most preferably 600° C. or more.

A most preferred aerogel is NANOGEL® manufactured by Cabot Corporation, Boston, Mass. Other suppliers of suitable aerogels include, but are not necessarily limited to NanoPore Inc., of Albuquerque, N.M.; Aspen Aerogels Inc., of Marlborough, Mass.; and Taasi Corporation, of Delaware, Ohio.

Silicon (silicate) based inorganic aerogels are normally produced either on a basis of water glass or acids as the raw material. Suitable processes for producing silica aerogels include, but are not necessarily limited to those described in U.S. Pat. No. 3,122,520; U.S. Pat. No. 6,481,649; U.S. Pat. No. 6,479,416; U.S. Pat. No. 6,475,561; WO 94/25149; WO 92/20623, all of which are incorporated herein by reference.

Generally, the quantity of aerogel used in a system fluid will be sufficient to produce a system fluid having a density of from about 1 lb/gal to about 8 lb/gal, preferably from about 3 lb/gal to about 6 lb/gal. The amount of aerogel required to achieve such reduced density will depend upon the type of aerogel and the "initial density" of the fluid in the absence of the aerogel.

As an example, to reduce the density of a given amount of water by one-half, say from 8.5 to 4.25 lb/gal, using 0.1 to 0.2 specific gravity aerogels, the final volume of the resulting mixture will be from about 0.55 to 0.62% aerogel. Put another way, in order to prepare 100 bbls of a 4.25 lb/gal underbalanced fluid from an 8.5 lb/gal initial fluid requires inclusion of an amount of aerogel of from about 55 to about 62% of the final mix. The precise percentage will vary with the specific gravity of the aerogel used. Take the situation where the aerogel is NANOGEL®. The amount of NANOGEL® required to produce a fluid having a density of 6 lb/gal from an initial fluid having a density of 8 lb/gal is about 24 lb/bbl, and the amount of NANOGEL® required to produce a fluid having a density of about 4 lb/gal is about 48 lb/bbl.

Aerogels may be either hydrophilic or hydrophobic, depending on the process used in their construction and their composition. For example, alcohol dried aerogels generally have sealed pores which are impervious to water. Carbon dioxide dried aerogels generally are hydrophilic. Hydrophilic aerogels are preferred for use in relatively hydrophilic systems, such as water-based systems. Hydrophobic aerogels are preferred for use in relatively hydrophobic systems, such as oil-base systems. However, it is possible to disperse a hydrophobic aerogel in a hydrophilic system, or to disperse a relatively hydrophilic aerogel in a hydrophobic system, by first mixing the aerogel with a suitable surfactant. In a preferred embodiment, an aerogel is used such that a combination of heat, moderate pH (from about 8 to about 13), and contact with water converts the aerogel back to a silicone gel. The collapse of the aerogel structure permits hole clean up without the need to use corrosive acids. The residue of the filter cake may be collected using completion screens or gravel packs.

The system fluid in which the aerogel is used may be water-based or oil-based. The phrase "water-based" includes any system fluid comprising water or a water-based solution as the continuous phase, including oil-in-water and oil-in-brine emulsions. The system fluids of the present application also may be oil based. The phrase "oil-based" includes system fluids comprising an organic material as a continuous phase, including water-in-oil and brine-in-oil emulsions, also sometimes called "invert emulsions."

Examples of suitable organic materials for the "oil" of such system fluids include but are not necessarily limited to olefins, paraffins, water insoluble polyglycols, water insoluble esters, diesel, water insoluble Fischer-Tropsch reaction products, and other organic materials, preferably materials that are non-toxic at the concentrations used, and combinations thereof. Suitable olefins are branched and/or linear and preferably are relatively nontoxic synthetic olefins. Examples of preferred olefins include but are not necessarily limited to polyalphaolefins, linear alpha olefins, and internal olefins, typically skeletally isomerized olefins. Most preferred olefins are described in U.S. Pat. Nos. 5,605,872 and 5,851,958, incorporated herein by reference. Preferred paraffins are described in U.S. Pat. No. 5,837,655, incorporated herein by reference.

The "oil" and other components used in the system fluid preferably are non-toxic. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. Preferred system fluids meet relevant environmental standards in the location of the operation.

In order to be effective for use during drilling operations, the particular system fluid must have effective rheology and lubricity properties, and for near balanced and over-balanced drilling, effective fluid loss control properties. Viscosity preferably is controlled in the reduced density system fluids by adding certain polymers to the fluid. The system fluid preferably contains polymers that are capable of viscosifying the drilling system fluid and/or providing filtration control for the drilling system fluid. Preferred polymers are non-toxic and will depend upon the base fluid. Suitable polymers include, but are not necessarily limited to water soluble starches and modified versions thereof, water soluble polysaccharides and modified versions thereof, water soluble celluloses and modified versions thereof, and water soluble polyacrylamides and copolymers thereof. Generally, the quantity of polymer used is at least about 2 lb/bbl. or more, preferably about 7.5 lb/bbl. or more.

Starches that are suitable for use in the system fluids include, but are not necessarily limited to corn based and potato based starches, preferred starches being more temperature stable starches. Polysaccharides that are suitable for use in the system fluids including, but not necessarily limited to xanthan polysaccharides, wellan polysaccharides, scleroglucan polysaccharides, and guar polysaccharides. Celluloses that are suitable for use in the system fluids include, but are not necessarily limited to hydrophobically modified hydroxyethyl coluloses and cationic cellulose ethers. Suitable copolymers of acrylamide include copolymers with acrylate monomers, hydrophobic N-isopropylacrylamide, and the like.

As used herein, the terms "modified starches" and "modified polysaccharides" or "synthetically modified polysaccharides" refer to starches and polysaccharides that have been chemically modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311–388 (Roy L. Whistler, et. al. eds., 1984), incorporated herein by reference.

Specific examples of suitable modified starches and modified polysaccharides include, but are not necessarily limited to: carboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, other starch and polysaccharide copolymers having similar characteristics. Preferred modified starches and/or modified polysaccharides comprise a functional group selected from the group consisting of a carboxymethyl group, a propylene glycol group, and an epichlorohydrin group.

Where the system fluid is water-based, preferred viscosifiers and filtration control agents are biopolymers, including but not necessarily limited to XAN-PLEX™ D, BIO-PAQ™ and/or BIOLOSE™, all of which are commercially available from Baker Hughes INTEQ.

Where the system fluid is oil-base, preferred viscosifiers are organophilic clays and preferred filtration control agents are asphaltic and lignitic materials.

The viscosity of a fluid is its internal resistance to flow as measured in centipoise units. The coefficient of viscosity of a normal homogeneous fluid at a given temperature and pressure is a constant for that fluid and independent of the rate of shear or the velocity gradient. Fluids that obey this rule are "Newtonian" fluids. In fluids called "non-Newtonian fluids," this coefficient is not constant but is a function of the rate at which the fluid is sheared as well as of the relative concentration of the phases. Drilling fluids generally are non-Newtonian fluids. Non-Newtonian fluids frequently exhibit plastic flow, in which the flowing behavior of the material occurs after the applied stress reaches a critical value or yield point (YP). Yield points in drilling fluids are frequently expressed in units of pounds per square 100 feet, wherein the yield point is a function of the internal structure of the fluid.

In drilling, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids and is similarly measured in centipoise units. In drilling fluids, yield points (YP) above a minimum value are desirable to adequately suspend solids, such as weighting agents and cuttings. The fluid preferably has a yield point of from about 20 to about 50, preferably 30 or more pounds per 100 square feet.

Conventional additives may be used in the fluid. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides; one or more bridging and/or weighting agents may be added to the fluid, and combinations thereof. Suitable shale stabilizers include, but are not necessarily limited to polyglycols, inorganic salts, chelates, amines, alkanolamines, alkanolamides, amphoteric compounds, alone or in aqueous solutions, and mixtures thereof. Suitable shale stabilizing inorganic salts include, but are not necessarily limited to alkali metal salts, silicate salts, and aluminum salts. Acids include acids used to treat cement contamination.

Preferred systems for use with the aerogels are PERF-FLOW® and SCIFLOW™, which are commercially available from Baker Hughes INTEQ, Houston, Tex.

The fluid is prepared using conventional procedures. It may be desirable to use injection, induction, and/or shear in order to achieve adequate mixing.

The pH of the fluid is measured and, if needed, adjusted to from about 8.5 to about 11.5, preferably about 9.5. The pH preferably is adjusted using a suitable organic base as a buffer. Substantially any buffer may be used. Suitable buffers include, but are not necessarily limited to ethanolamines (preferably triethanolamines), alkali metal hydroxides, preferably sodium or potassium hydroxide, alkali metal acetates, preferably sodium or potassium acetate. Preferred buffers are alkali metal oxides, most preferably magnesium oxide.

The application will be better understood with reference to the following examples, which are illustrative only:

EXAMPLE 1

A fluid was prepared having the following composition:

| Additive | Concentration |
| --- | --- |
| Water | .90 bbl. |
| XCD | 1.0 lb./bbl. |
| Starch | 2 lb./bbl. |
| NANOGEL | 12.5 lb./bbl. |

The rheological and HPHT/PPA filtration control properties were measured using standard procedures with the following results:

| Mud Properties | Value |
| --- | --- |
| MW | 6.17 ppg |
| 600 Fann | 38 |
| 300 Fann | 31 |
| PV | 7 |
| YP | 14 |
| 200 Fann | 26 |
| 100 Fann | 21 |
| 6 Fann | 8 |
| 3 Fann | 7 |
| 10 sec Gel | 8 |
| 10 min. Gel | 12 |
| API | 3.0 |
| HTHP | 12 |
| pH | 8.5 |

The fluid demonstrated low density and suitable rheological and filtration control properties.

EXAMPLE 2

A fluid was prepared having the following composition:

| Additive | Concentration |
| --- | --- |
| Water | .90 bbl. |
| XCD | 1.0 lb./bbl. |
| Starch | 2 lb./bbl. |
| NANOGEL | 24 lb./bbl. |

The rheological and HPHT/PPA filtration control properties were measured using standard procedures with the following results:

| Mud Properties | Value |
|---|---|
| MW | 5.8 ppg |
| 600 Fann | 34 |
| 300 Fann | 26 |
| PV | 8 |
| YP | 18 |
| 200 Fann | 22 |
| 100 Fann | 16 |
| 6 Fann | 6 |
| 3 Fann | 5 |
| 10 sec Gel | 5 |
| 10 min. Gel | 10 |
| API | 3.1 |
| HTHP | 12 |
| pH | 8.5 |

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A system fluid comprising an amount of one or more inorganic aerogels comprising particles comprising a bubble matrix comprising retained gas, the one or more aerogels having a density of about 0.35 g/cm$^3$ or less, wherein the amount of the one or more aerogels is sufficient to produce a system fluid density of from about 1 lb/gal to about 8 lb/gal.

2. The system fluid of claim 1 wherein said system fluid is selected from the group consisting of water-based and oil-based fluid.

3. The system fluid of claims 2 wherein the amount of the one or more inorganic aerogels is from about 55 to about 62% of said system fluid.

4. A system fluid comprising an amount of one or more inorganic aerogels comprising particles comprising a bubble matrix comprising retained gas, the one or more aerogels having a density of about 0.35 g/cm$^3$ or less, wherein the amount of the one or more aerogels is sufficient to produce a system fluid density of from about 3 lb/gal to about 6 lb/gal.

5. A system fluid having comprising an amount of one or more inorganic aerogels comprising particles comprising a bubble matrix comprising retained gas, the particles having a density of about 0.35 g/cm$^3$ or less, the amount being effective to reduce the density of the system fluid compared to the same system fluid absent the one or more aerogels.

6. The system fluid of claim 5 wherein said one or more inorganic aerogels comprise silicon oxide.

7. The system fluid of claim 6 wherein said one or more inorganic aerogels comprise particles having an average diameter of up to about 200 μm.

8. The system fluid of claim 7 wherein said one or more inorganic aerogels comprise particles having an average diameter of about 1 μm or more.

9. The system fluid of claim 8 wherein said one or more inorganic aerogels comprise particles having a density of from about 0.1 to about 0.35 g/cm$^3$.

10. The system fluid of claim 9 wherein said one or more inorganic aerogels comprise about 90% gas or more.

11. The system fluid of claim 10 wherein said one or more inorganic aerogels comprise particles having a total surface area of about 200 m$^2$/g or more.

12. The system fluid of claim 11 wherein the retained gas selected from the group consisting of air, oxygen, helium, nitrogen, carbon dioxide, and inert or low activity gases.

13. The system fluid of claim 12 wherein said one or more inorganic aerogels are stable at temperatures of about 150° C. or more.

14. The system fluid of claim 12 wherein said one or more inorganic aerogels are stable at temperatures of about 250° C. or more.

15. The system fluid of claim 12 wherein said one or more inorganic aerogels are stable at temperatures of about 350° C. or more.

16. The system fluid of claim 12 wherein said one or more inorganic aerogels are stable at temperatures of about 450° C. or more.

17. The system fluid of claim 12 wherein said one or more inorganic aerogels are stable at temperatures of about 600° C. or more.

18. The system fluid of claim 12 wherein said amount of said one or more inorganic aerogels is sufficient to produce a system fluid density of from about 1 lb/gal to about 8 lb/gal.

19. The system fluid of claim 12 wherein said amount of said one or more inorganic aerogels is sufficient to produce a system fluid density of from about 3 lb/gal to about 6 lb/gal.

20. The system fluid of claim 11 wherein the retained gas comprises air.

21. The system fluid of claim 11 wherein the retained gas comprises helium.

22. The system fluid of claim 10 wherein said one or more inorganic aerogels comprise particles having a total surface area of about 600 m$^2$/g or more.

23. The system fluid of claim 10 wherein said one or more inorganic aerogels comprise particles having a total surface area of about 700 m$^2$/g or more.

24. The system fluid of claim 9 wherein said one or more inorganic aerogels comprise about 95% gas or more.

25. The system fluid of claim 8 wherein said one or more inorganic aerogels comprise particles having a density of about 0.2 g/cm$^3$ or less.

26. The system fluid of claim 6 wherein said one or more inorganic aerogels comprise particles having an average diameter of from about 1 μm to about 44 μm.

27. The system fluid of claim 5 comprising a drilling system fluid selected from the group consisting of drilling fluids, drill-in fluids, completion fluids, workover fluids, and spotting fluids.

28. The system fluid of claim 27 wherein the one or more inorganic aerogels comprise a particle size distribution effective to bridge pores in a subterranean formation and to produce an effective filter cake.

29. The system fluid of claim 28 wherein said one or more inorganic aerogels comprise particles having a density of from about 0.1 to about 0.35 g/cm$^3$.

30. The system fluid of claim 5 wherein said one or more inorganic aerogels comprise particles having a density of about 0.2 g/cm$^3$ or less.

31. The system fluid of claim 30 wherein said one or more inorganic aerogels comprise particles having an average diameter of from about 1 μm to about 44 μm.

32. The system fluid of claim 5 selected from the group consisting of drilling fluids, drill-in fluids, completion fluids, workover fluids, spotting fluids, and cementing fluids.

33. The system fluid of claim 5 wherein said one or more inorganic aerogels comprise an element selected from the group consisting of silicon, aluminum, titanium, zirconium, tin, lithium, cerium, vanadium, and mixtures thereof.

34. The system fluid of claim 5 wherein said one or more inorganic aerogels comprise silicon.

35. The system fluid of claim 5 wherein said one or more inorganic aerogels comprise particles having an average diameter of from about 1 μm to about 44 μm.

36. The system fluid of claim 5 wherein said particle size distribution is effective to bridge pores in a subterranean formation.

37. The system fluid of claim 2 wherein said system fluid is selected from the group consisting of water-based and oil-based fluid.

38. The system fluid of claim 5 wherein said system fluid comprises an oil selected from the group consisting of olefins, paraffins, water insoluble polyglycols, water insoluble esters, diesel, water insoluble Fischer-Tropsch reaction products, and combinations thereof.

39. The system fluid of claim 5 comprising one or more non-toxic synthetic olefins.

40. The system fluid of claim 5 comprising one or more non-toxic olefins selected from the group consisting of poly-alphaolefins, linear alpha olefins, and internal olefins.

41. The system fluid of claim 5 wherein said one or more inorganic aerogels comprise particles having a density of from about 0.1 to about 0.35 $g/cm^3$.

* * * * *

UNITED STATES PATENT AND TRADEMARK OFFICE
CERTIFICATE OF CORRECTION

PATENT NO.        : 8,034,749 B2
APPLICATION NO.   : 10/744443
DATED             : October 11, 2011
INVENTOR(S)       : Alsobrook et al.

It is certified that error appears in the above-identified patent and that said Letters Patent is hereby corrected as shown below:

Col. 9, claims 1, 3, 4, 5, 6, 7, 8, 9, 10, 11, line 2; col. 10, claims 13, 14, 15, 16, 17, 18, 19, 22, 23, 24, 25, 26, 28, 29, 30, 31, 33, line 2; col. 11 and col. 12, claims 34, 35 and 41 line 2 after "inorganic" insert --hydrophilic--

Claim 5, l. 1, after the word "fluid", delete the word "having."

Cancel claim 21.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

PATENT NO.         : 8,034,749 B2
APPLICATION NO.    : 10/744443
DATED              : October 11, 2011
INVENTOR(S)        : Charles W. Alsobrook et al.

Page 1 of 3

It is certified that error appears in the above-identified patent and that said Letters Patent is hereby corrected as shown below:

Delete the title page and substitute therefor the attached title page showing the corrected number of claims in patent.

Column 9, line 29 (Claim 1, line 2) after "inorganic" insert --hydrophilic--.
Column 9, line 38 (Claim 3, line 2) after "inorganic" insert --hydrophilic--.
Column 9, line 41 (Claim 4, line 2) after "inorganic" insert --hydrophilic--.
Column 9, line 46 (Claim 5, line 1) after the word "fluid", delete the word "having".
Column 9, line 47 (Claim 5, line 2) after "inorganic" insert --hydrophilic--.
Column 9, line 53 (Claim 6, line 2) after "inorganic" insert --hydrophilic--.
Column 9, line 55 (Claim 7, line 2) after "inorganic" insert --hydrophilic--.
Column 9, line 58 (Claim 8, line 2) after "inorganic" insert --hydrophilic--.
Column 9, line 61 (Claim 9, line 2) after "inorganic" insert --hydrophilic--.
Column 9, line 64 (Claim 10, line 2) after "inorganic" insert --hydrophilic--.
Column 9, line 66 (Claim 11, line 2) after "inorganic" insert --hydrophilic--.
Column 10, line 5 (Claim 13, line 2) after "inorganic" insert --hydrophilic--.
Column 10, line 9 (Claim 14, line 2) after "inorganic" insert --hydrophilic--.
Column 10, line 11 (Claim 15, line 2) after "inorganic" insert --hydrophilic--.
Column 10, line 15 (Claim 16, line 2) after "inorganic" insert --hydrophilic--.
Column 10, line 18 (Claim 17, line 2) after "inorganic" insert --hydrophilic--.
Column 10, line 21 (Claim 18, line 2) after "inorganic" insert --hydrophilic--.
Column 10, line 24 (Claim 19, line 2) after "inorganic" insert --hydrophilic--.
Column 10, lines 28-29, cancel claim 21.
Column 10, line 31 (Claim 22, line 2) after "inorganic" insert --hydrophilic--.
Column 10, line 34 (Claim 23, line 2) after "inorganic" insert --hydrophilic--.
Column 10, line 37 (Claim 24, line 2) after "inorganic" insert --hydrophilic--.
Column 10, line 39 (Claim 25, line 2) after "inorganic" insert --hydrophilic--.
Column 10, line 42 (Claim 26, line 2) after "inorganic" insert --hydrophilic--.

This certificate supersedes the Certificate of Correction issued May 29, 2012.

Signed and Sealed this
Nineteenth Day of June, 2012

David J. Kappos
*Director of the United States Patent and Trademark Office*

CERTIFICATE OF CORRECTION (continued)
U.S. Pat. No. 8,034,749 B2

Column 10, line 49 (Claim 28, line 2) after "inorganic" insert --hydrophilic--.
Column 10, line 53 (Claim 29, line 2) after "inorganic" insert --hydrophilic--.
Column 10, line 56 (Claim 30, line 2) after "inorganic" insert --hydrophilic--.
Column 10, line 59 (Claim 31, line 2) after "inorganic" insert --hydrophilic--.
Column 10, line 65 (Claim 33, line 2) after "inorganic" insert --hydrophilic--.
Column 11, line 2 (Claim 34, line 2) after "inorganic" insert --hydrophilic--.
Column 11, line 4 (Claim 35, line 2) after "inorganic" insert --hydrophilic--.
Column 12, line 10 (Claim 41, line 2) after "inorganic" insert --hydrophilic--.

(12) United States Patent
Alsobrook et al.

(10) Patent No.: US 8,034,749 B2
(45) Date of Patent: Oct. 11, 2011

(54) AEROGELS EFFECTIVE TO REDUCE DRILLING FLUID DENSITY

(75) Inventors: Charles W. Alsobrook, Houston, TX (US); Thomas A. Jones, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 847 days.

(21) Appl. No.: 10/744,443

(22) Filed: Dec. 23, 2003

(65) Prior Publication Data

US 2004/0147405 A1 Jul. 29, 2004

Related U.S. Application Data

(60) Provisional application No. 60/437,305, filed on Dec. 31, 2002.

(51) Int. Cl.
*C09K 8/00* (2006.01)
*C09K 8/05* (2006.01)

(52) U.S. Cl. ........ 507/140; 166/305.1; 177/65; 507/143
(58) Field of Classification Search .................. 507/140, 507/143; 166/305.1; 175/65
See application file for complete search history.

(56) References Cited

U.S. PATENT DOCUMENTS

| | | | |
|---|---|---|---|
| 2,093,454 A | 9/1937 | Kistler | |
| 2,109,337 A | 2/1938 | Mayfield | |
| 2,455,188 A | 12/1948 | Oxford | |
| 2,584,085 A * | 1/1952 | Stross | 508/136 |
| 3,122,520 A | 2/1964 | Lentz | |
| 3,951,824 A | 4/1976 | Maxson | |
| 5,501,277 A | 3/1996 | Onan et al. | |
| 5,605,872 A | 2/1997 | Engel et al. | |
| 5,728,654 A | 3/1998 | Dobson, Jr. et al. | |
| 5,837,655 A | 11/1998 | Halliday et al. | |
| 5,851,958 A | 12/1998 | Halliday et al. | |
| 6,131,661 A | 10/2000 | Conner et al. | |
| 6,475,561 B1 | 11/2002 | Schwertfeger | |
| 6,479,416 B1 | 11/2002 | Frank et al. | |
| 6,481,649 B1 | 11/2002 | Schmidt | |
| 2004/0147405 A1 | 7/2004 | Alsobrook et al. | |
| 2006/0009364 A1* | 1/2006 | Dobson et al. | 507/110 |

FOREIGN PATENT DOCUMENTS

| | | |
|---|---|---|
| EP | 0 786 507 A | 7/1997 |
| GB | 1 171 409 A | 11/1969 |
| WO | WO 92/20623 | 11/1992 |
| WO | WO 94/25149 | 11/1994 |

OTHER PUBLICATIONS

Lee et al., Low-density hydrophobic aerogels, Journal of Non-Crystalline Solids, 1995, 186, 18-22.*
Restek Corporation, Mesh Size Conversions Reference Chart, http://www.restek.com/calcs/ref_meshes.asp, 2005.*
Trademark Serial No. 75414818, NANOGEL, May 6, 2003.*
Cameron et al. The Effect of Drilling Fluid Density and Underbalanced Drilling on Formation Damage Minimization, F95-P-84, Sep. 11, 1995, Exploration & Production Technology Group, Amoco Corporation.
Sanchez, Liteden Density Reductor For Drilling Fluids, downloaded from Internet (http://www.mauretechnology.com/JIP/DGD/Presentations/KOmeeting/PDVSA.pdf), Sep. 2001, La filial de petréleos de Venezuela (PDVSA).
Pekala, R. W., "Organic Aerogels from the Polycondensation of Resorcinol with Formaldehyde," Journal of Materials Science, 1989, pp. 3221-3227, vol. 24, No. 9.
Kistler, S.S., "Coherent Expanded Aerogels and Jellies," Nature A Weekly Journal of Science, 1931, p. 741, vol. 127, No. 3211, Macmillan and Co., Limited, New York, USA.
Gesser, H.D. and Goswami, P.C., "Aerogels and Related Porous Materials," Chemical Reviews, 1989, pp. 765-788, vol. 89, No. 4, American Chemical Society.
Gregg, S.J. and Sing, K.S.W., "6. The Use of Gas Adsorption for the Determination of Surface Area and Pore Size Distribution," Adsorption, Surface Area and Porosity, Second Edition, 1982, pp. 283-286, Academic Press.
Rutenberg, M. W. and Solarek, D.; "Chapter X Starch Derivatives: Production and Uses"; Starch: Chemistry and Technology; 1984; pp. 311-388; Academic Press, Inc.; USA.
USPTO, First Office Action for U.S. Appl. No. 11/456,389, Feb. 16, 2007.
The Morris Law Firm, P.C., Response to First Office Action for U.S. Appl. No. 11/456,389, Apr. 24, 2007.
PCT International Search Report for Application No. PCT/US03/41734, Dec. 13, 2003.
The Morris Law Firm, P.C., Article 19 Amendment for Application No. PCT/US03/41734, Aug. 2, 2004.
The Morris Law Firm, P.C., Response to References for Application No. PCT/US03/41734, Jan. 26, 2005.
PCT International Preliminary Examination Report for Application No. PCT/US03/41734, Apr. 8, 2005.
Journal of Non-Cyrstalline Solids, North Holland Physics Publishing Amsterdam, NL, vol. 186, Jun. 15,1995, pp. 18-22.

* cited by examiner

*Primary Examiner* — Timothy J. Kugel
(74) *Attorney, Agent, or Firm* — Paula D. Morris; The Morris Law Firm, P.C.

(57) ABSTRACT

Use of aerogels reduce the density of system fluids useful during drilling operations and system fluids comprising aerogels.

40 Claims, No Drawings